Dec. 30, 1930.     J. W. HUGHES     1,787,154
CAP NUT
Filed Nov. 20, 1926

INVENTOR:
James W. Hughes,
BY
John P. Tarbox
ATTORNEY.

Patented Dec. 30, 1930

1,787,154

UNITED STATES PATENT OFFICE

JAMES W. HUGHES, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

CAP NUT

Application filed November 20, 1926. Serial No. 149,730.

This invention provides a new and improved form of cap nut, especially adapted to the attachment of demountable motor vehicle wheels to their hubs, but capable of many other uses.

An object of the invention is the production of a nut by a minimum number of machining steps.

Another object of the invention is the production of such a nut in a most economical and efficient manner, without unnecessary waste of material or work.

Still another object is the provision of a nut of the greatest possible strength without excess of material.

Other objects and advantages will appear in the course of the following description.

Figure 1:
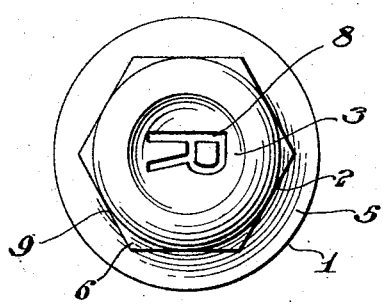
Figure 2:
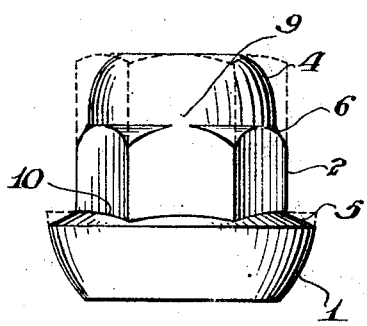
Figure 4:
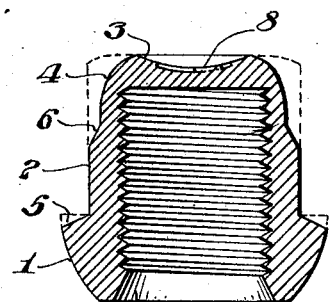
Figure 3:
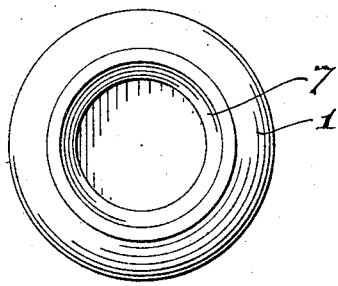

The improved nut is illustrated by the appended drawings in which Figures 1, 2, 3 and 4 comprise respectively, plan, elevation, bottom view, and central section thereof.

The subject of the invention constitutes an improvement over previous cap nuts and in particular, over such as shown in Patent Number 1,376,390, patented April 26, 1921, to A. J. Michelin, for a "demountable wheel."

The nut of the present invention, like that of the above patent comprises a ball or spherical shaped wheel engaging face. The ball or spherical face is provided, in this instance, to engage and bear on correspondingly-shaped depressions surrounding the bolt holes of the wheel to be attached by means of these nuts. Due to its being a zone of a sphere below a diametral plane, the surface 1 is rather abruptly tapered, giving the same effect as a conical surface. The hexagonal portion of the nut provides a convenient means for engagement by a wrench.

In the new and improved nut the distinguishing features are the conical buttress portion 5, the substantially spherical or dome-shaped cap end 4 and the depressed portion 3. In accordance with the idea of lightening the structure without weakening it, the hexagonal portion 2 is of such a height as to provide proper engagement for the wrench, but is continued to the end in a substantially spherical or dome-shaped form 4, thus eliminating excess material heretofore present in the elongated hexagonal portion, as shown by dotted lines in Figs. 2 and 4. Transition from the hexagonal form to the dome-shaped form is through an easily coned section represented as 6. Similarly transition from the hexagonal portion to the spherical face is made through another coned section 5. Here, more material is saved over the old form as shown by the dotted lines, without affecting the strength of the nut.

The interior of the nut is threaded and countersunk, as at 7, in the conventional manner, the threads extending substantially the length of the nut to the faced end of the bore.

The concave depressed portion 3 has impressed in it the letter "L" or "R" to indicate that the nut is either left or right-hand respectively, and that it is to be used on correspondingly threaded studs or bolts. This letter, as indicated at 8 in the several views, lies wholly beneath the plane of the end of the nut and hence is protected thereby from abrasion or marring.

It is to be noted that the transition from hexagonal to domed section at 6 is facilitated by the fact that the diameter of the hexagon across the "flats" is that of the base portion of the dome. This also facilitates the formation of the nut from round bar stock, of the same diameter as that of the dome-shaped portion 4, by an upsetting process, with consequent economy of material and increase in strength.

All of the features noted above make the improved nut particularly fitted for manufacture in a cold-upsetting or heading machine. There are no sharp corners nor abrupt changes of section to interrupt the metal flow and cause cold shuts, cracks, etc. The amount of material in the nut having been reduced to a minimum, danger of collapse by bending, instead of upsetting, during the upsetting operation, is obviated, since the unsupported length of the blank is as short as possible.

The spherical face 1, due to the coned portion 5, stands up clear of its holder during machining, enabling proper treatment of the entire surface. Furthermore, such "flash" as is left at the outside of the spherical face, is trimmed off in machining the face to its true spherical shape, eliminating a flash-cutting operation.

The end depression 3 of the nut, is of spherical contour, but of such depth and curvature as to blend into the dome shape without marked change. This spherical depression, and the easy lines of the rest of the nut fit it for rapid burnishing in a ball-mill.

Having thus described the invention what is claimed and is desired to be secured by Letters Patent is:

1. A cold forged cap nut comprising a solid forged main body having a tapered engaging face, merging by a conical surface into a polygonal body, a dome-like end portion surmounting said body, of a diameter substantially equal to that of the polygon across the sides and connected thereto by a fragmentary cone-shaped portion, and a spherical depression in the top of said dome-like end, having a distinguishing character impressed therein.

2. A cold forged cap nut comprising a main body having a cap section of dome-like contour having a slightly concave central depression therein, a polygonal body having its sides tangent to the base circle of said cap section, an enlarged bearing face of tapered contour, said bearing face, body and cap end surfaces being connected and merged together by conical transition surfaces.

3. A cold forged cap nut comprising a solid forged main body having a tapered engaging face merging by a conical surface into a polygonal body, and a dome-like end portion surmounting said body, said end portion being of a diameter substantially equal to that of the polygon across the sides thereof and connected thereto by a fragmentary cone-shaped portion.

In testimony whereof he hereunto affixes his signature.

JAMES W. HUGHES.